United States Patent [19]
Fleenor et al.

[11] Patent Number: 5,934,461
[45] Date of Patent: *Aug. 10, 1999

[54] METAL CIGARETTE PACKAGE

[75] Inventors: John J. Fleenor, Midlothian; J. Lee Gregory, Richmond; John E. Tindall, Midlothian; Duane C. Wilder, Chesterfield, all of Va.

[73] Assignee: Philip Morris Incorporated, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/664,549

[22] Filed: Jun. 17, 1996

Related U.S. Application Data

[62] Division of application No. 08/207,848, Mar. 9, 1994, Pat. No. 5,526,559.

[51] Int. Cl.⁶ .............................. A24F 15/00; B65D 85/20
[52] U.S. Cl. ......................... 206/259; 206/261; 206/443; 206/524.6
[58] Field of Search ..................... 206/259, 261, 206/265, 268, 443, 425, 37, 524.6, 819

[56] References Cited

U.S. PATENT DOCUMENTS

| | | |
|---|---|---|
| 1,711,971 | 5/1929 | Schulze . |
| 1,830,583 | 11/1931 | Woller . |
| 1,980,871 | 11/1934 | Willett . |
| 3,391,780 | 7/1968 | Pasquine et al. . |
| 4,194,627 | 3/1980 | Christensen ............................. 206/545 |
| 4,277,298 | 7/1981 | L'Allenman . |
| 4,309,888 | 1/1982 | Miller et al. . |
| 4,386,457 | 6/1983 | Coombs .................................... 29/235 |
| 4,386,514 | 6/1983 | Herten . |
| 4,711,611 | 12/1987 | Bachmann et al. . |
| 4,771,882 | 9/1988 | Lowe et al. . |
| 4,934,167 | 6/1990 | Grims et al. . |
| 4,955,480 | 9/1990 | Sexton ................................... 206/528 |
| 4,976,131 | 12/1990 | Grims et al. . |
| 5,111,679 | 5/1992 | Kobayashi et al. . |
| 5,119,658 | 6/1992 | Saunders . |
| 5,148,916 | 9/1992 | Tillyer, Sr. ............................. 206/352 |
| 5,209,354 | 5/1993 | Thornhill et al. ....................... 206/469 |

FOREIGN PATENT DOCUMENTS

| | | |
|---|---|---|
| 840386 | 7/1949 | Germany . |
| 1950172 | 11/1966 | Germany . |
| 939088 | 10/1963 | United Kingdom . |

*Primary Examiner*—David P. Bryant
*Attorney, Agent, or Firm*—Burns Doane Swecker & Mathis, L.L.P.

[57] ABSTRACT

A method for forming an aluminum cigarette package includes the step of cutting elliptical blanks from an aluminum sheet and shaping the blanks by progressive drawing operations into a lid and a body. The lid and body are joined by a flexible label that serves as a hinge that allows the lid to be pivoted relative to the body to open and close the pack. In an alternative embodiment of the invention, a drawn aluminum body is provided with a flat cap member having an aperture and a resealable closure. The invention includes a metal package made by the method of the invention.

8 Claims, 5 Drawing Sheets

METAL CIGARETTE PACKAGE

This application is a divisional, of application Ser. No. 08/207,848, filed Mar. 9, 1994, now U.S. Pat. No. 5,526,559.

FIELD OF THE INVENTION

The present invention relates to methods for making cigarette packages and more particularly to a method of making a recyclable cigarette package from an aluminum blank by a progressive drawing operation. The invention also relates to a recyclable aluminum cigarette package made by the method of the invention.

BACKGROUND AND SUMMARY OF THE INVENTION

Cigarette packages perform the functions of containing a preselected bundle of cigarettes and protecting the cigarettes from mechanical and environmental damage. In addition, a package protects the freshness of the cigarettes, which deteriorates with exposure to air.

Cigarette packages are typically made from paper into the so-called soft package that tears open on a top panel, and from paperboard into the so-called hard package that typically includes an integral reclosable lid. Both types of package generally include a foil or foil laminate wrapped around the cigarettes, and an additional sealed plastic film, typically polypropylene, wrapper around the outside of the package. The foil wrapper and outer plastic film are included to maintain the freshness of the packaged cigarettes.

A serious problem with packaging of all kinds is in disposal. Landfills and other disposal sites are becoming overwhelmed by packaging materials, and alternatives, such as reusable or recyclable packaging are being sought. While theoretically, paper-based cigarette packaging can be recycled, there are many practical difficulties. For example, packages typically include paints and inks that may render the packing material unsuitable for recycling. A more serious long term difficulty is that paper can be recycled only a limited number of times before the pulp becomes unusable.

The present invention provides a method of making a cigarette package from a recyclable material that can be recycled an indefinite number of times. The present invention provides a cigarette package having a major portion that may be recycled after use, rather than discarded as waste.

The present invention, generally, also provides a method of making a cigarette package that has improved crush resistance than the conventional paper or paperboard package. In addition, an aluminum package formed by a drawing process of the present invention includes two portions, a body portion and a lid portion that have inherently sealed edges that help maintain the freshness of the contents.

The present invention provides a method for making a cigarette package by a drawing operation involving at least one drawing step, in which a body portion and a lid portion are independently formed and joined to make the package.

More particularly, the present invention provides a method for making an aluminum cigarette package by a drawing process in which a first blank is formed from a sheet of metal, the first blank is formed into a hollow, substantially rectangular body in a drawing operation, the body having an open end and an opposed closed bottom panel, and having a front panel, a rear panel substantially parallel to the front panel, and opposing, substantially parallel side panels perpendicular to both the front panel and the rear panel, a second blank is formed from a second sheet of metal, the second blank is then formed into a hollow, substantially rectangular lid in a second drawing operation, the lid having an open end and an opposing closed top and a front, a rear substantially parallel to the front, and opposing, substantially parallel sides perpendicular to both the front and the rear, and an edge of the rear panel of the body and an edge of the rear of the lid at the respective open ends are joined by a flexible tape, a label, or other means to form a hinge.

The package may be selectively opened and closed by pivoting the lid at the hinge for relative movement between the lid and body.

The package of the present invention is formed so that an innerframe portion is formed in the body by a press or embossing operation. The innerframe ensure correct closure of the lid. When the lid is in a closed position, the lid closes over the innerframe portion, and friction between the lid and the innerframe helps to maintain the lid in a closed position. The innerframe portion also provides a barrier at the seam between the body and the lid to help protect the contents of the package. In an alternative embodiment of the invention, the innerframe portion is formed from a separate blank in an independent step and is installed in the container with a suitable adhesive after the trimming step.

In an alternative embodiment of the present invention, an aluminum body portion is formed by a drawing process. A flat, rectangular cap having an access aperture is formed in an independent stamping or punching operation. The cap is attached to the body portion at the open end, and a reclosable seal is placed over the cap to close aperture.

BRIEF DESCRIPTION OF THE DRAWING FIGURES

The present invention can be further understood with reference to the following description in conjunction with the appended drawings, wherein like elements are provided with the same reference numerals. In the drawings.

DETAILED DESCRIPTION OF PREFERRED EMBODIMENTS

Figures 1, 3, 4:
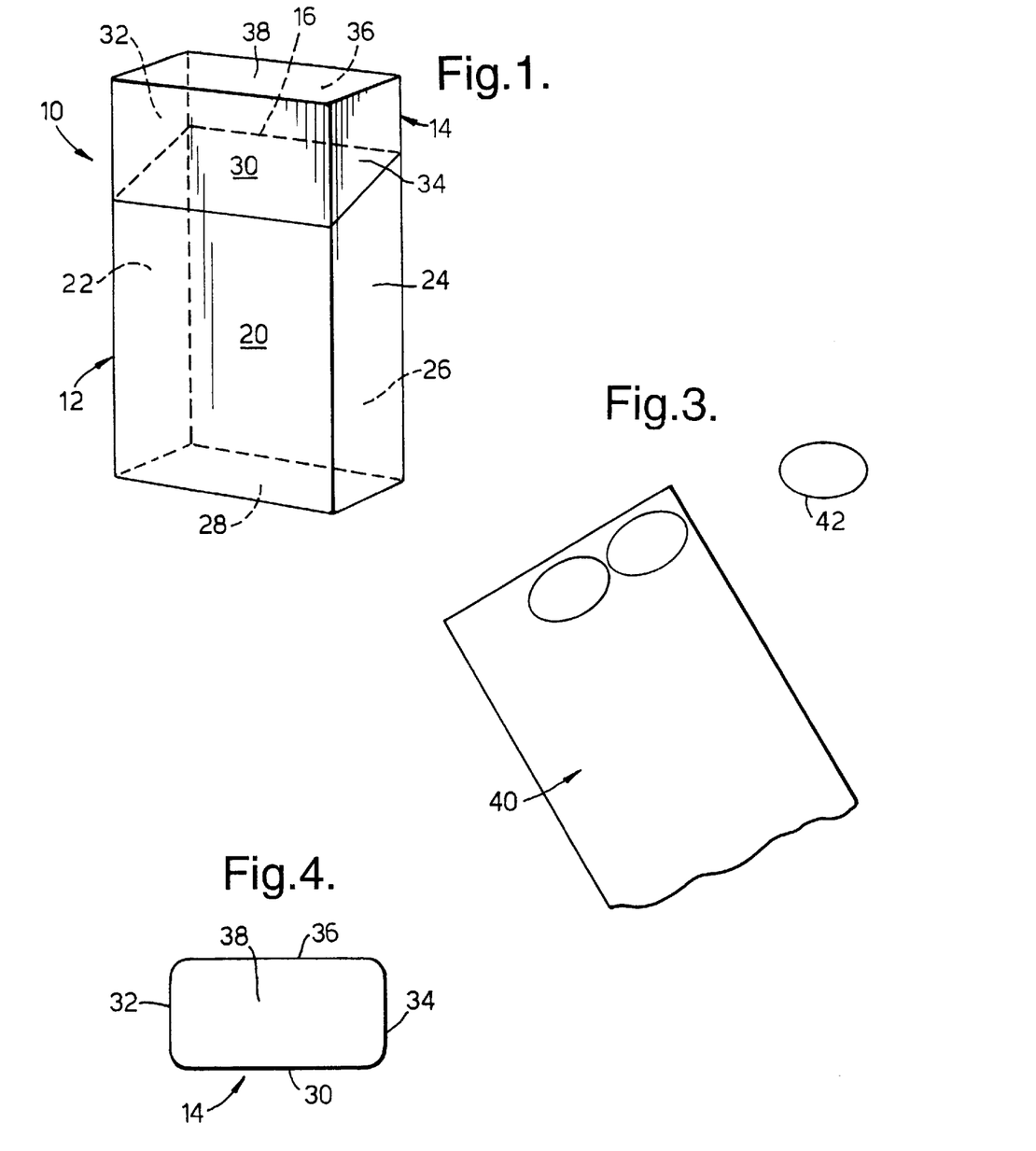
FIG. 1 is a perspective view of an aluminum package of the present invention.
FIG. 3 is a schematic view of an aluminum coil sheet and a formed blank.
FIG. 4 is a top view of a lid of the cigarette package.

FIG. 1 is a perspective view of a flip-top cigarette package 10 of the present invention. The package 10 is similar to the so-called flip-top box cigarette package known in the art, and includes a substantially rectangular body portion 12 and a substantially rectangular lid portion 14. The body portion 12 includes a front panel 20, a left side panel 22, a right side panel 24, a rear panel 26 and a bottom panel 28. The lid portion 14 includes a front 30, a left side 32, a right side 34, a rear 36 and a top 38. The lid rear 36 is attached to the body rear panel 26 at a hinge line 16. The hinge 16 allows the lid 14 to be pivoted in a single motion so that the lid front 30 moves away from the body front panel 20, thus opening the package 10.

The package 10 of the present invention is formed of a thin, malleable sheet material, preferably a metal, such as aluminum. Aluminum offers an advantage of forming a sturdy package that resists deformation to protect the contents of the package, and the additional advantage that it may be recycled for reuse of the material, thus reducing solid waste disposal. In addition, aluminum is suitable to be formed into the body 12 and lid portions 14 of the package by the process of the present invention. Moreover, a drawn aluminum package has no joined seams, except a seam between the lid and body, and aluminum is impervious to moisture and air penetration. The package of the present invention can optionally eliminate the inner foil liner of conventional paper and paperboard packages, saving material.

Figure 2:
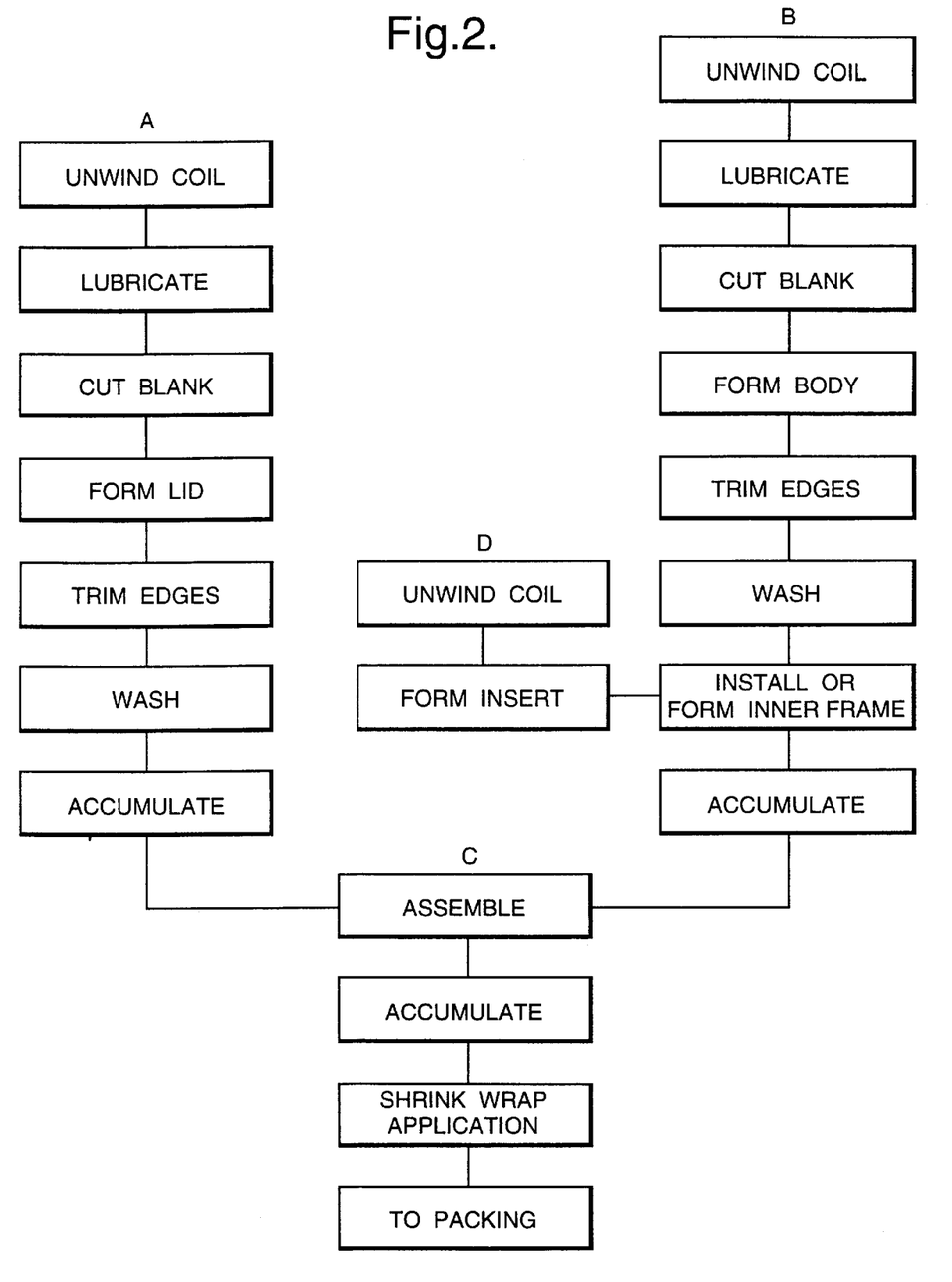
FIG. 2 is a flow diagram of a method of the present invention for forming an aluminum package.

FIG. 2 is a flow diagram of a progressive draw method for forming a flip-top aluminum package. FIG. 2 illustrates two parallel operation branches, a first branch A for forming the lid portion 14, and a second branch B for forming the body portion 12 of FIG. 1. The branches A and B converge in a third branch C for assembly of the lid 14 and body 12 into a completed package 10. The steps of branch A and branch B need not be performed simultaneously, but the branches A and B must provide a sufficient number of bodies and lids for use in the branch C assembly steps.

The lid 14 is formed in the branch A by a first step of unwinding a coil of aluminum sheet stock and feeding the sheet into a lubricating unit. The lubricating unit lubricates the sheet for the later drawing steps. A blank of aluminum material is cut from the lubricated sheet material. FIG. 3 is an illustration of the sheet material 40 and a blank 42 cut from the sheet. The blank 42 is elliptical in shape to accommodate the lid's flat, rectangular top 38 that is longer, and requires more material, from side to side than from front to back, and minimize the amount of waste material left after forming the lid.

The blank is then moved to a forming press, where a progressive drawing operation forms the lid 14. A first drawing step forms a shallow cup that is somewhat wider and longer than the completed lid 14. At least a second drawing step is employed to narrow and shape the shallow cup of the first operation, and deepen the front, sides and rear of the cup into the appropriate size for the lid 14. FIG. 4 is a top view of a lid formed by the present method. As shown, the lid is formed with rounded corners where the front 30, left side 32, right side 34 and rear 36 meet. In contrast, paperboard packages, which are formed by creasing and folding, have relatively sharp corners.

Figure 5:
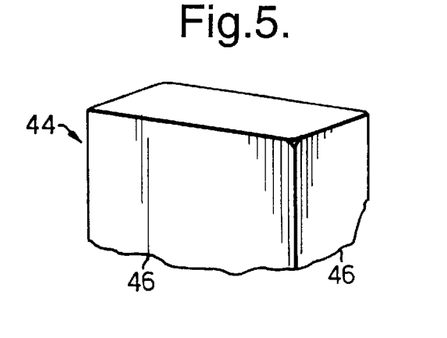
FIG. 5 is a perspective view of an untrimmed lid formed in a drawing operation.

As is known in the art, a drawing operation results in "earing" of the open edges of the stock material, which must be removed for the finished piece. The unfinished lid 44 resulting from the drawing operation is shown in FIG. 5. The unfinished lid 44 has ragged open edges 46 that result from the drawing operation.

Figure 6:
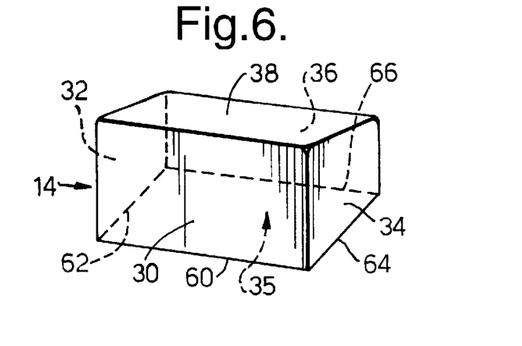
FIG. 6 is a perspective view of the lid of FIG. 5 after a trimming step.

The unfinished lid 44 is next finished to remove the ragged edges 46. In an embodiment of the method illustrated in FIG. 6, the ragged edges 46 are trimmed so that the front 30 is longer from the top 38 to the open end 35 than is the rear 36. The left 32 and right 34 sides are trimmed to have a trapezoidal shape so that the upper left edge 62 and the upper right edge 64 form a continuous edge with the trimmed front edge 60 and rear edge 66 of the lid 14. An opening 35 defined by the trimmed edges lies in a plane oblique to the top panel 38. The trimmed edges 60, 62, 64, and 66 are also rounded and smoothed to remove any sharpness or burrs.

The trimmed lid 14 is next washed in a washing step to remove the drawing lubricant and to clean the lid inside for containing the cigarettes, and outside for the proper adhesion of labels and wrapping. The cleaning step is performed using a chemical wash, and may alternatively employ detergents or soap and water as is known in the art.

The washed lid 14 is then moved to an accumulator that collects prepared lids and modulates the flow of lids to the assembly branch C.

In branch B, the steps for forming the body portion 12 of the package 10 are performed. A coil of aluminum sheet material is first unwound and fed to a lubricator station. The sheet is lubricated at the lubricator station for the subsequent drawing operations. An elliptically shaped blank is cut from the sheet for forming into the body 12. The blank 42 illustrated in FIG. 3 shows the shape of the blank for the body 12, although it is understood that the blank for the body is larger than the blank for the lid 14. The blank is elliptical in shape to allow sufficient material for the formation of the rectangular bottom 28 and corners where the front 20, sides, 22, 24 and rear panel 26 meet.

Figure 7:
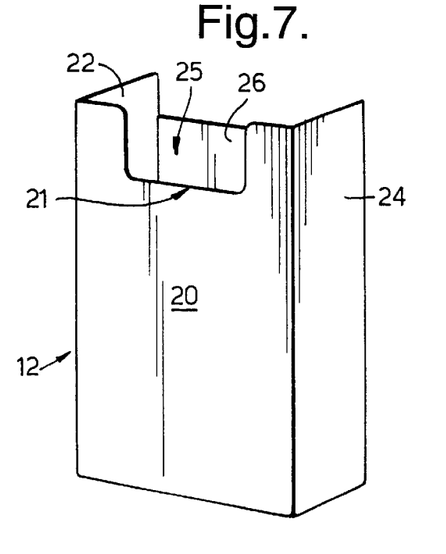
FIG. 7 is a perspective view of a body of a cigarette package formed in a draw operation.

The blank is fed to a forming station where the blank is drawn into a shallow cup, and then in progressive drawing steps is deepened and shaped into the hollow rectangular shape of the body 12. The fully drawn cup has rounded corners where the front 20, left side panel 22, right side panel 24 and rear panel 26 meet. The fully drawn cup has eared edges similar to those illustrated in FIG. 5. The edges of the fully drawn cup are finished in a next step. In a first embodiment of the invention, the edges of the fully drawn cup are trimmed as illustrated in FIG. 7. The body formed by this trimming step has a front panel 20, a left panel 22, and a right panel 24 all having substantially the same length from the bottom 28 of the body to the open end 25. The rear panel 26 is trimmed shorter than the other panels to accommodate the lid 14 and hinge 16 in the assembly steps, described below. The front panel 20 has a cut-out portion 21 at the open edge. The cut-out portion 21 provides access to cigarettes packed in the completed package, as is known in the packaging art.

The body 12 is formed with rounded corners between the panels, and the view of the lid 12 in FIG. 4 illustrates the appearance of the formed body 12.

The trimmed body 20 is washed in a washing step to remove lubricant, clean the body interior for packaging of cigarettes, and clean the exterior for good adherence of labels and wrapping. The washing step may be by a chemical wash process or by detergent and water or other suitable means.

Figure 8:
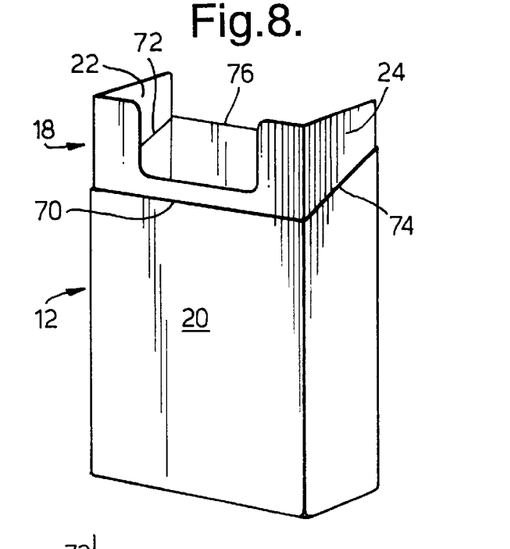
FIG. 8 is a perspective view of a body of a cigarette package having an innerframe member.

The washed body 20 is then moved to an innerframe forming station where an upper portion 18 of the front panel 20, left panel 22 and right panel 24 are creased and recessed toward the interior of the body to form an innerframe portion, as illustrated in FIG. 8. The crease 72 of the left panel 22 and the crease 74 of the right panel 24 are formed to cooperate and align with the left edge 62 and right edge 64 of the lid 14, shown in FIG. 6. As shown, the top edge 76 of the rear panel 26 aligns with the creased edges 72 and 74 of the left and right panels, respectively. The rear panel 26 is not creased or formed for the innerframe. The top edge 76 of the rear panel 26 is joined in a subsequent step with the open edge of the lid rear 36 to form the hinge 16 for the package 10.

The innerframe portion 18 provides structural stiffness to the body 20. The innerframe portion 18 also cooperates with the lid 14, which is closed over the innerframe portion, to hold the lid in a closed position, illustrated in FIG. 1.

Figure 9:
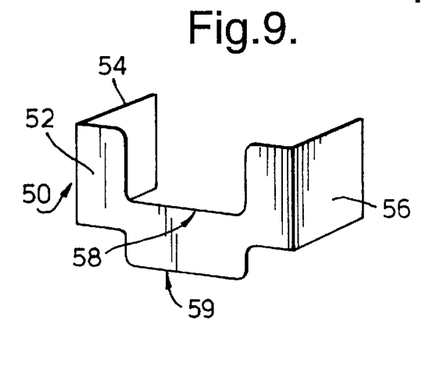
FIG. 9 is a perspective view of an innerframe member of a cigarette package.
Figure 10:
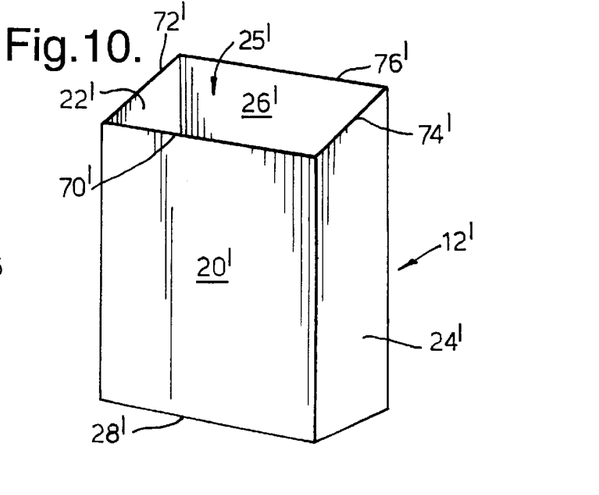
FIG. 10 is a perspective view of an alternative embodiment of a body portion of a cigarette package.

In an alternative embodiment of the present method, a separate inner framemember 50, illustrated in FIG. 9, is formed in an additional operation branch D. To form the innerframe 50, a coil of aluminum sheet material is first unwound, and an innerframe member 50 is cut from the sheet and shaped in suitable pressing operation as shown. The innerframe member 50 has a front flap 52, a left side flap 54 and a right side flap 56. The front flap 52 includes a cut-out portion 58 as described above for access to the finished package, and a lower flap 59 to provide stiffness to the innerframe. In the finishing step of this alternative embodiment, the panels of the fully drawn cup are trimmed as shown in FIG. 10. The front panel 20' is trimmed to be shorter from the bottom 28' to the open edge 70', than the back panel 26'. The left side edge 72' and the right side edge 74' are trimmed to complement the left edge 62 and right edge 64 of the lid 14.

The body 12' is next washed to remove the drawing lubricant and to prepare the body for packaging of cigarettes, as described previously. After washing, the innerframe 50 is inserted and attached in the body 12' using a suitable adhesive or other appropriate means so that the innerframe partially extends from the open end 25' of the body. The assembled innerframe 50 and body 12' then appear as the body 12 in FIG. 8.

The bodies 12 or 12' are then moved to an accumulator that collects the prepared bodies and modulates the flow of bodies to the assembly branch C.

Figure 11:
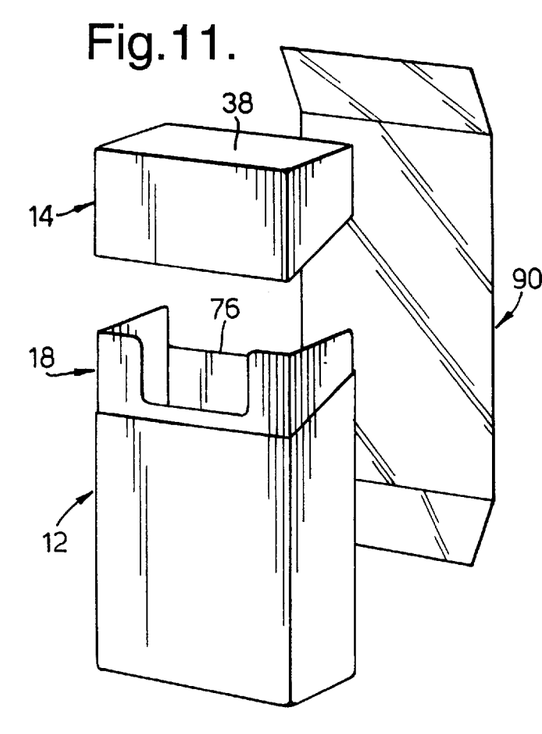
FIG. 11 is a schematic of an operation for assembling the lid and body into a package.

In branch C, the prepared lid 14 and body 12 (or 12') from each of the accumulating steps of branches A and B are assembled to form the package 10. The assembly operation is illustrated schematically in FIG. 11. The lid 14 is placed over the innerframe 18 of the body 12 so that the edges of the front panel, side panels and rear panel of the body 12 abut the edges of the front, sides and rear of the lid 14, respectively. A flexible adhesive tape 90 is placed on the rear panel 26 of the body 12 and rear 36 of the lid 14, and overlapped onto the top 38 of the lid and bottom 28 of the body. The tape 90 is a flexible strip of paper or plastic material that holds the rear panel 26 of the body 12 in abutment with the lid rear 36. The tape 90 allows the lid 14 to pivot away from the body 12 at the hinge 16 formed where the rear 36 and rear panel 26 abut. The tape 90 is sized to cover the entire rear area of the package 10 and top 38 and bottom 28 to serve as a label to carry brand identification or other information about the contents of the package 10. Alternatively, the tape may be a narrow strip sufficient to fasten the rear 36 and rear panel 26 together.

Figure 12:
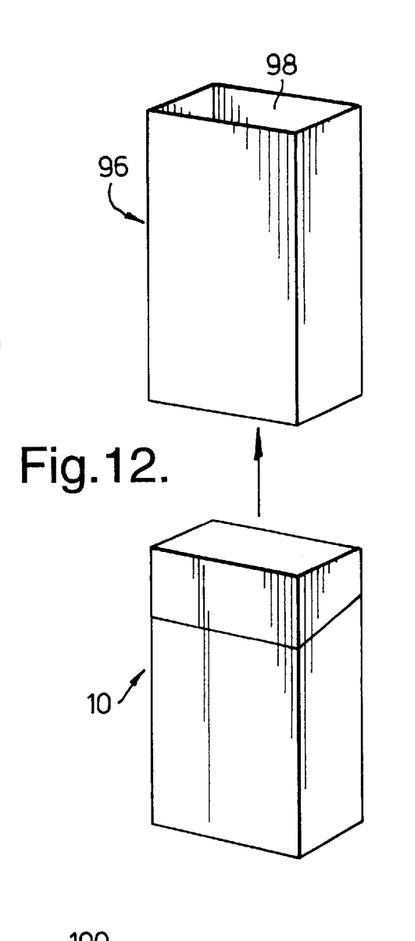
FIG. 12 is a schematic of a step for applying a wrapping to the assembled package of FIG. 11.

The assembled packages 10 are inserted in a sleeve 96 of heat-shrink plastic material, as illustrated in FIG. 12.

Figure 13:
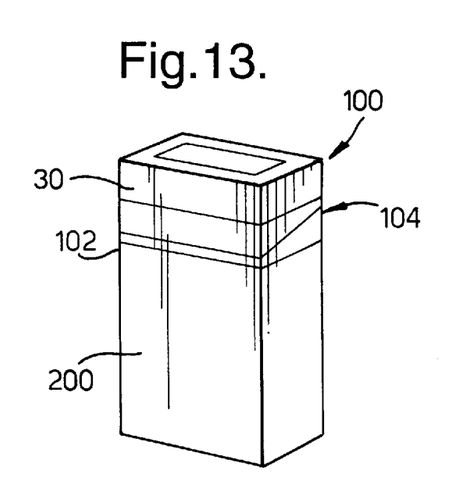
FIG. 13 is a perspective view of a package having an outer wrapper.

Alternatively, a sleeve or other exterior wrapping may be applied to the assembled package by adhesive or another suitable means. The sleeve 96 is then heated sufficiently to shrink the sleeve 96 to fit tightly on the package 10. The heating step is performed with a conventional heat source, such as heat lamps. FIG. 13 illustrates a package and shrink wrap assembly 100. The heat-shrink wrap 96 can be provided with labelling, packaging design, coloration, or printed information as indicated by the cross-hatching in FIG. 12. The interior surface 98 of the heat-shrink wrap that contacts the package 10 may optionally be provided with adhesive to secure it to the package and prevent removal or movement of the wrap after it is applied.

The assembled and wrapped packages 100 are accumulated for use by cigarette packaging apparatus. To package cigarettes in this wrapped package 100, a slitter cuts the wrap at the edge 102 between the front panel 20 and front 30 and between the respective left sides 22, 32 and right sides 24, 34. The package 100 may then be opened and a bundle of cigarettes inserted as is known in the art. The package 100 with cigarettes is then closed and sealed with a strip of tape 104 or other suitable material on the slit edge.

Figure 14:
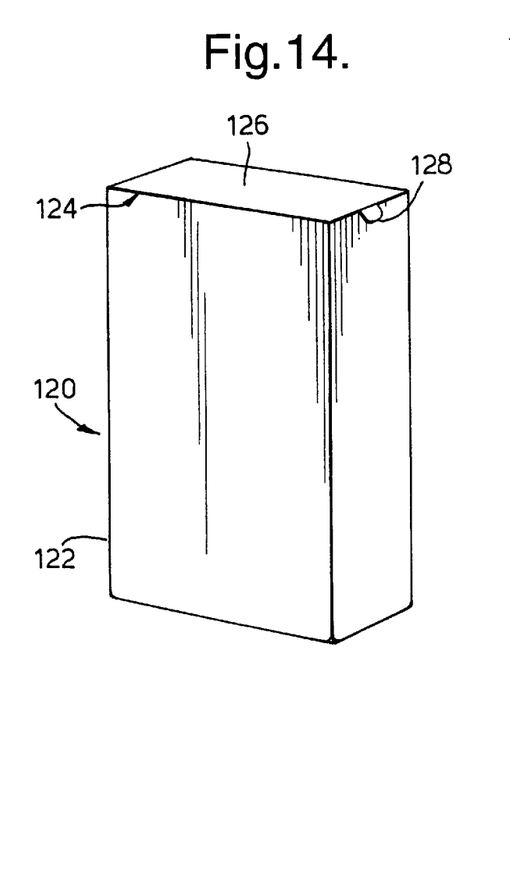
FIG. 14 is a perspective view of an alternative embodiment of the package of the present invention.

An alternative embodiment of a drawn aluminum cigarette package 120 of the present invention is shown in FIG. 14. The package 120 comprises a body portion 122 and a cap portion 124. Closure means 126 is fastened to the cap portion 124 to cover the cap.

Figure 15:
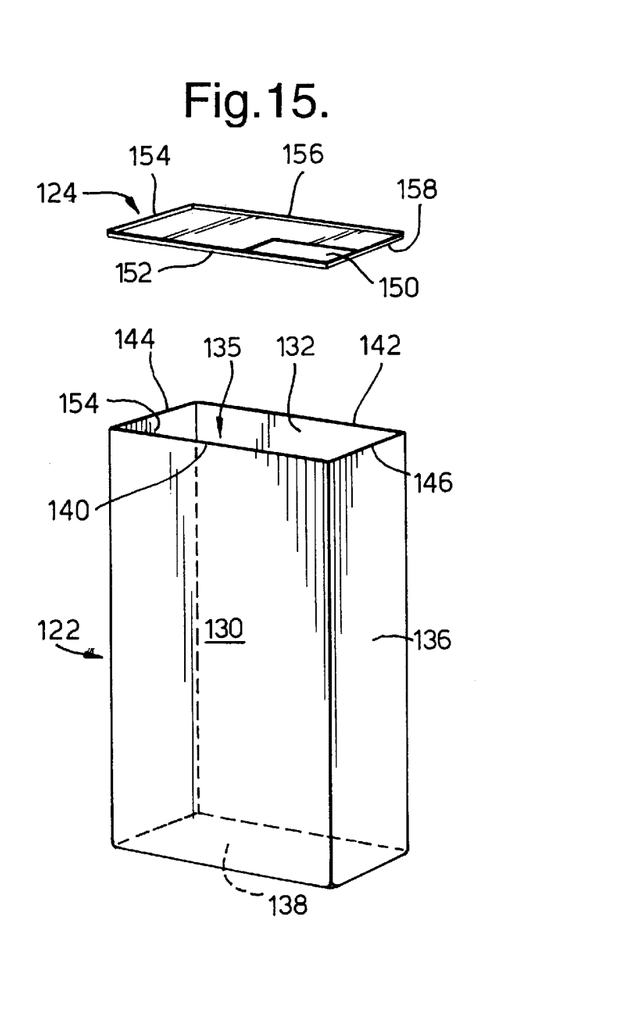
FIG. 15 is a perspective view illustrating an assembly method for the package of FIG. 14.

FIG. 15 is an exploded view of the package 120. The body portion 122 is a hollow, substantially rectangular body having a front panel 130, and a rear panel 132, the rear panel being substantially parallel to the front panel. Opposing side panels, a left panel 134 and a right panel 136 are mutually parallel and perpendicular to the front 130 and rear 132 panels. A closed end 138 of the body 122 lies opposite the open end 135.

The body 122 is formed in a method similar to the method described above in connection with FIG. 2. A blank is formed from a lubricated sheet of aluminum material, and by a progressive draw operation a cup is formed. The body 122 formed in this operation has rounded corners between the panels 130, 132, 134 and 136, as is illustrated in FIG. 4 for the lid 14. In a trimming step, the body 122 is trimmed so that the front panel 130, rear panel 132, left panel 134 and right panel have substantially the same length from the closed end 138 to the open end 135. The body 122 is formed to have a length sufficient for containing cigarettes of a selected length. The upper edges 140, 142, 144, and 146, respectively of the panels 130, 132, 134, and 136 are shaped for fastening to the cap 124, as further described below.

The cap 124 is a substantially flat, rectangular plate. The cap 124 has an aperture 150 in at least a corner area, as shown in FIG. 15. The aperture 150 provide access to cigarettes that are contained in a completed package. The cap is press formed from a blank of aluminum sheet material to the rectangular shape shown, and to provide the aperture 150. The edges 152, 154, 156 and 158 of the cap 124 are shaped for fastening with the edges 140, 142, 144 and 146 of the body 122. It is understood that the cap 124 is fastened to the body 122 after a bundle of cigarettes is packaged in the body.

FIG. 14 shows the cap 124 fastened to the body 122. The resealable closure means 126 is attached to the cap 124 to cover at least the aperture 150 (not visible in this view). In the embodiment shown, the closure means 126 covers the entire cap 124 to provide an aesthetically pleasing appearance. A tab 128 on the closure means 126 provides gripping means for selectively opening the closure means. The tab 128 is pulled away from the cap 124 to uncover the aperture 150. The closure means 126 is a thin tape of flexible material, such as foil, plastic or metallized plastic. An adhesive backing is applied to the closure means 126 for fastening the closure means to the cap 124. The adhesive is of the type that allows the selective release and re-fastening of the closure means 124 to the cap, for re-closing the package 120 to maintain freshness of the cigarettes.

The package 120, having a bundle of cigarettes inserted, and the cap 124 and closure means 126 attached may also be wrapped in a shrink-wrapper, or other exterior wrapper, as described above in connection with FIG. 12 and FIG. 13.

The foregoing has described the preferred principles, embodiments and modes of operation of the present invention; however, the invention should not be construed as limited to the particular embodiments discussed. Instead, the above-described embodiments should be regarded as illustrative rather than restrictive, and it should be appreciated that variations, changes and equivalents may be made by others without departing from the scope of the present invention as defined by the following claims.

What is claimed is:

1. A metal package, comprising:

a substantially rectangular, hollow body formed by drawing a first blank into a hollow, substantially rectangular body, the body having an open end and having a front panel, a rear panel substantially parallel to the front panel, and opposing, substantially parallel side panels, corners where the front panels, rear panel and side panels meet being rounded, and upper portions of the front panel and the opposing side panels being creased and recessed toward an interior of the body, the rear panel being planar and uncreased, such that an upper portion of the body, the upper portion of the body including the upper portions of the front panel and the opposing side panels and an upper portion of the rear panel, forms an innerframe portion;

a substantially rectangular, hollow lid formed by drawing a second blank into a hollow, substantially rectangular lid, the lid having a front, a rear substantially parallel to the front, and opposing, substantially parallel sides, corners where the front, rear, and sides meet being rounded, an interior of the lid being sized to receive the innerframe portion therein; and a flexible adhesive tape attached to the rear panel and the rear of the lid.

2. A metal package, comprising:

a substantially rectangular, hollow body formed by drawing a first blank into a hollow, substantially rectangular body, the body having an open end and having a front panel, a rear panel substantially parallel to the front panel, and opposing, substantially parallel side panels, corners where the front panels, rear panel and side panels meet being rounded, and upper portions of the front panel and the opposing side panels being creased and recessed toward an interior of the body, the rear panel being planar and uncreased, such that an upper portion of the body, the upper portion of the body including the upper portions of the front panel and the opposing side panels and an upper portion of the rear panel, forms an innerframe portion;

a substantially rectangular, hollow lid formed by drawing a second blank into a hollow, substantially rectangular lid, the lid having a front, a rear substantially parallel to the front, and opposing, substantially parallel sides, corners where the front, rear, and sides meet being rounded, an interior of the lid being sized to receive the innerframe portion therein; and a label of flexible material attached to at least the rear panel and the rear of the lid.

3. A metal package, comprising:

a substantially rectangular, hollow body formed by drawing a first blank into a hollow substantially rectangular body, the body having an open end and having a front panel, a rear panel substantially parallel to the front panel, and opposing, substantially parallel side panels, corners where the front panels, rear panel and side panels meet being rounded, and upper portions of the front panel and the opposing side panels being creased and recessed toward an interior of the body, the rear panel being substantially planar and uncreased, such that an upper portion of the body, the upper portion of the body including the upper portions of the front panel and the opposing side panels and an upper portion of the rear panel, forms an innerframe portion;

a substantially rectangular, hollow lid formed by drawing a second blank into a hollow, substantially rectangular lid, the lid having a front, a rear substantially parallel to the front, and opposing, substantially parallel sides, corners where the front, rear, and sides meet being rounded, an interior of the lid being sized to receive the innerframe portion therein; and a flexible adhesive tape attached to the rear panel and the rear of the lid, wherein the front panel has a cutout extending downwardly from a top edge of the front panel.

4. A metal package, comprising:

a substantially rectangular, hollow body formed by drawing a first blank into a hollow, substantially rectangular body, the body having an open end and having a front panel, a rear panel substantially parallel to the front panel, and opposing, substantially parallel side panels, corners where the front panels, rear panel and side panels meet being rounded, and upper portions of the front panel and the opposing side panels being creased and recessed toward an interior of the body, the rear panel being substantially planar and uncreased, such that an upper portion of the body, the upper portion of the body including the upper portions of the front panel and the opposing side panels and an upper portion of the rear panel, forms an innerframe portion;

a substantially rectangular, hollow lid formed by drawing a second blank into a hollow, substantially rectangular lid, the lid having a front, a rear substantially parallel to the front, and opposing, substantially parallel sides, corners where the front, rear, and sides meet being rounded, an interior of the lid being sized to receive the innerframe portion therein; and a flexible adhesive tape attached to the rear panel and the rear of the lid, wherein the rear panel is shorter than the front panel and the side panels.

5. A metal package, comprising:

a substantially rectangular, hollow body formed by drawing a first blank into a hollow, substantially rectangular body, the body having an open end and having a front panel, a rear panel substantially parallel to the front panel, and opposing, substantially parallel side panels, corners where the front panels, rear panel and side panels meet being rounded, and upper portions of the front panel and the opposing side panels being creased and recessed toward an interior of the body, the rear panel being substantially planar and uncreased, such that an upper portion of the body, the upper portion of the body including the upper portions of the front panel and the opposing side panels and an upper portion of the rear panel, forms an innerframe portion;

a substantially rectangular, hollow lid formed by drawing a second blank into a hollow, substantially rectangular lid, the lid having a front, a rear substantially parallel to the front, and opposing, substantially parallel sides, corners where the front, rear, and sides meet being rounded, an interior of the lid being sized to receive the innerframe portion therein; and a flexible adhesive tape attached to the rear panel and the rear of the lid, wherein the side panels of the lid are trapezoidal.

6. A metal package, comprising:

a substantially rectangular, hollow body formed by drawing a first blank into a hollow, substantially rectangular body, the body having an open end and having a front panel, a rear panel substantially parallel to the front panel, and opposing, substantially parallel side panels, corners where the front panels, rear panel and side panels meet being rounded, and upper portions of the front panel and the opposing side panels being creased and recessed toward an interior of the body, the rear panel being substantially planar and uncreased, such that an upper portion of the body, the upper portion of the body including the upper portions of the front panel and the opposing side panels and an upper portion of the rear panel, forms an innerframe portion;

a substantially rectangular, hollow lid formed by drawing a second blank into a hollow, substantially rectangular lid, the lid having a front, a rear substantially parallel to the front, and opposing, substantially parallel sides, corners where the front, rear, and sides meet being rounded, an interior of the lid being sized to receive the innerframe portion therein; and a label of flexible material attached to at least the rear panel and the rear of the lid, wherein the front panel has a cutout extending downwardly from a top edge of the front panel.

7. A metal package, comprising:

a substantially rectangular, hollow body formed by drawing a first blank into a hollow, substantially rectangular body, the body having an open end and having a front panel, a rear panel substantially parallel to the front panel, and opposing, substantially parallel side panels, corners where the front panels, rear panel and side panels meet being rounded, and upper portions of the front panel and the opposing side panels being creased and recessed toward an interior of the body, the rear panel being substantially planar and uncreased, such that an upper portion of the body, the upper portion of the body including the upper portions of the front panel and the opposing side panels and an upper portion of the rear panel, forms an innerframe portion;

a substantially rectangular, hollow lid formed by drawing a second blank into a hollow, substantially rectangular lid, the lid having a front, a rear substantially parallel to the front, and opposing, substantially parallel sides, corners where the front, rear, and sides meet being rounded, an interior of the lid being sized to receive the innerframe portion therein; and a label of flexible material attached to at least the rear panel and the rear of the lid, wherein the rear panel is shorter than the front panel and the side panels.

8. A metal package, comprising:

a substantially rectangular, hollow body formed by drawing a first blank into a hollow, substantially rectangular body, the body having an open end and having a front panel, a rear panel substantially parallel to the front panel, and opposing, substantially parallel side panels, corners where the front panels, rear panel and side panels meet being rounded, and upper portions of the front panel and the opposing side panels being creased and recessed toward an interior of the body, the rear panel being substantially planar and uncreased, such that an upper portion of the body, the upper portion of the body including the upper portions of the front panel and the opposing side panels and an upper portion of the rear panel, forms an innerframe portion;

a substantially rectangular, hollow lid formed by drawing a second blank into a hollow, substantially rectangular lid, the lid having a front, a rear substantially parallel to the front, and opposing, substantially parallel sides, corners where the front, rear, and sides meet being rounded, an interior of the lid being sized to receive the innerframe portion therein; and a label of flexible material attached to at least the rear panel and the rear of the lid, wherein the side panels of the lid are trapezoidal.

* * * * *